Jan. 17, 1961 S. W. BOOTH 2,968,240
INERTIA SWITCH AND MEANS CONTROLLED THEREBY
Filed April 28, 1943 3 Sheets-Sheet 1
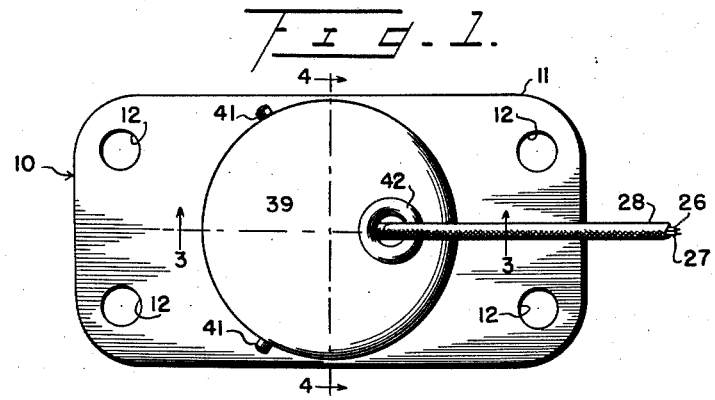
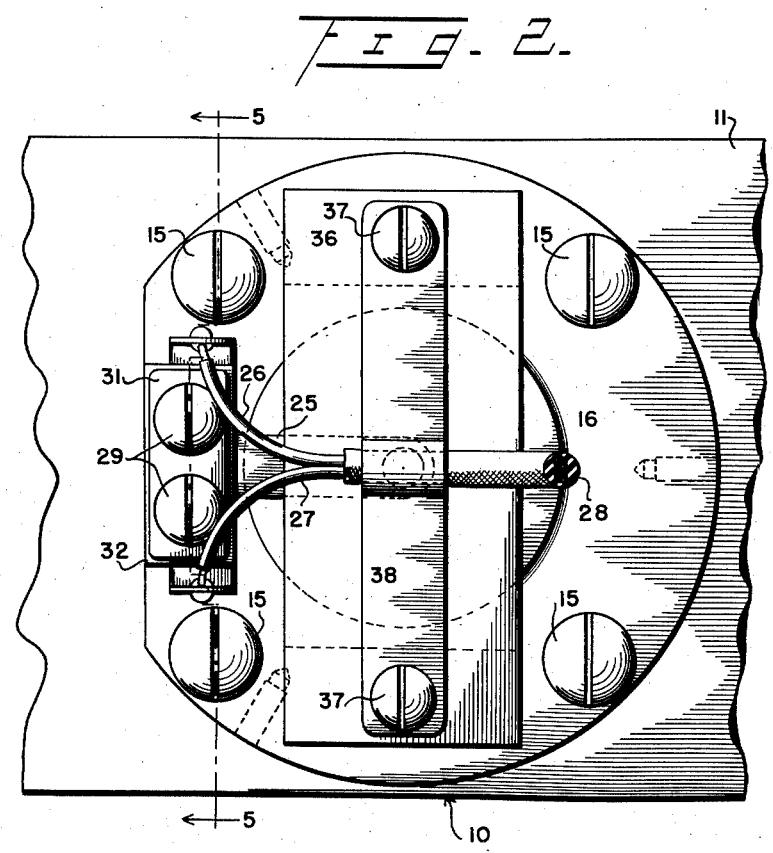
Inventor
S. W. BOOTH

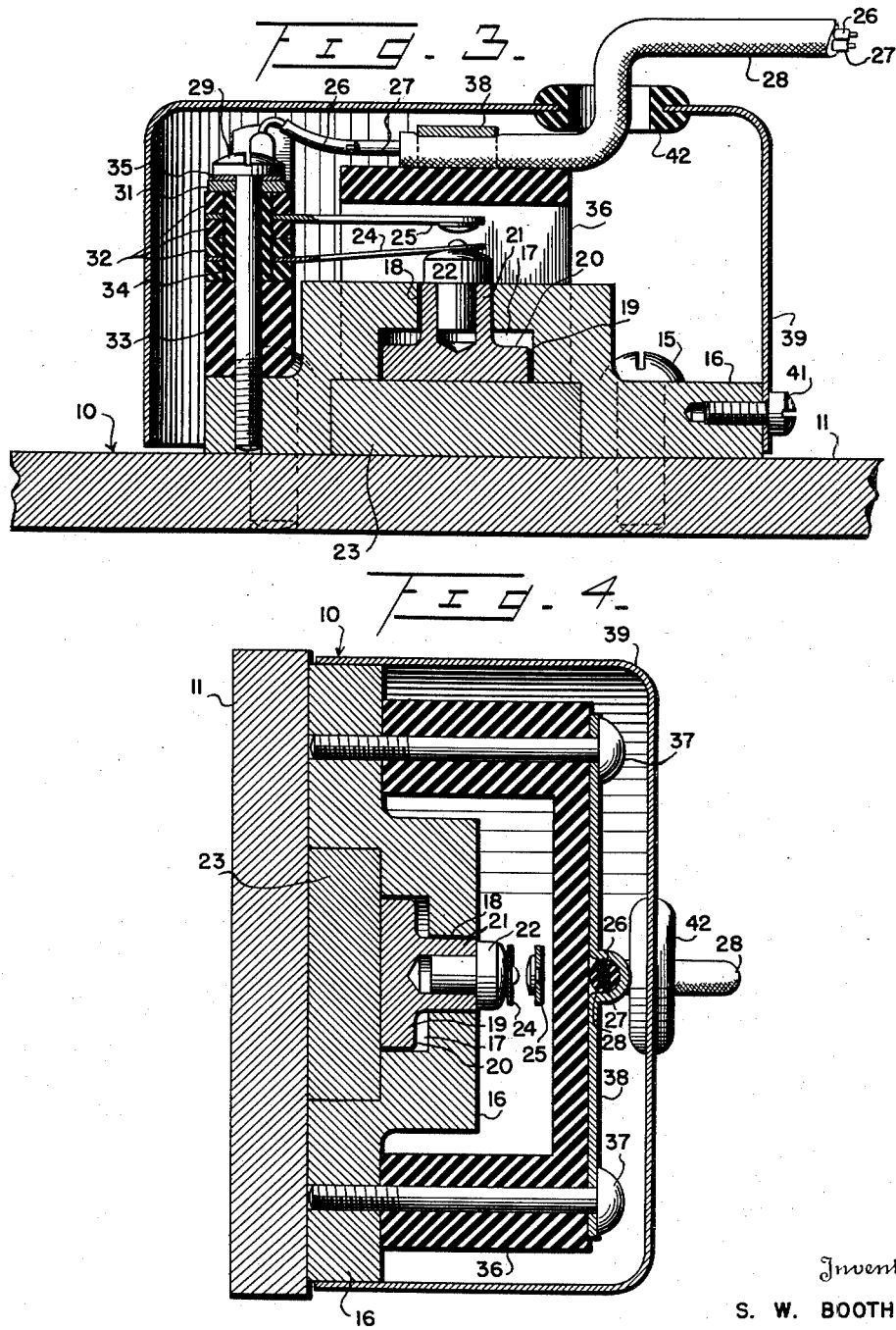

Jan. 17, 1961 S. W. BOOTH 2,968,240
INERTIA SWITCH AND MEANS CONTROLLED THEREBY
Filed April 28, 1943 3 Sheets-Sheet 3
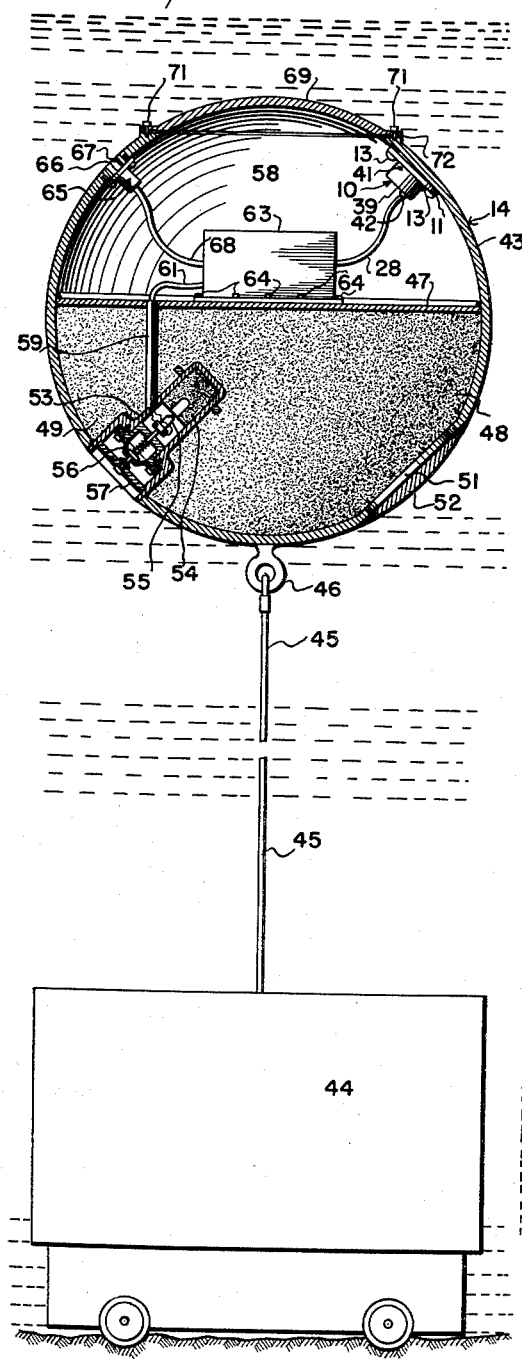
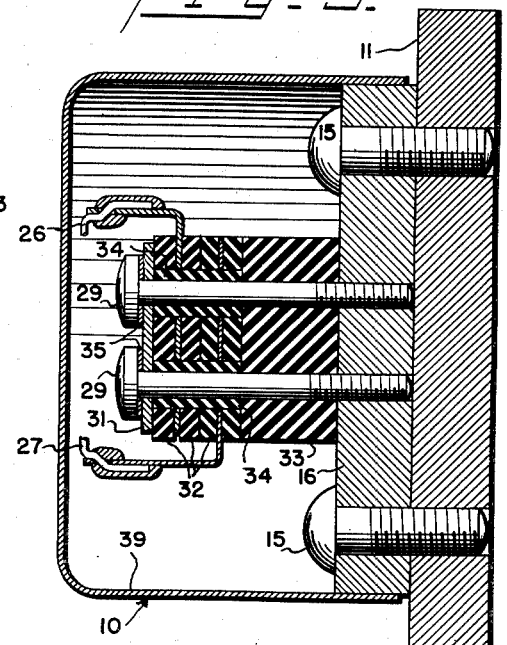
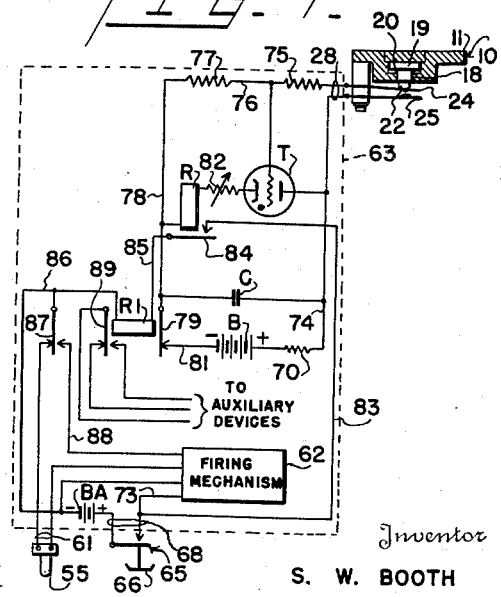
Inventor
S. W. BOOTH

United States Patent Office 2,968,240
Patented Jan. 17, 1961

2,968,240

INERTIA SWITCH AND MEANS CONTROLLED THEREBY

Seth W. Booth, Hyattsville, Md.

Filed Apr. 28, 1943, Ser. No. 484,854

9 Claims. (Cl. 102—16)

(Granted under Title 35, U.S. Code (1952), sec. 266)

This invention relates to inertia switch mechanisms and more particularly to an inertia operated switch adapted to respond to vibrations or pressure impulses received through a surrounding fluid by a casing to which the switch is attached and is particularly adapted for use with marine mines to prevent the premature firing of the mine in response to a countermine shock or impulse received through the surrounding water.

Various devices have heretofore been employed to prevent the premature explosion of a mine as a result of a countermine shock, such devices comprising pendulums and inertia controlled elements adapted to be moved from an initial position by a shock or impulse. In the case of pendulum devices, for example, it is, of course, necessary to support the pendulum structure in a predetermined position by means of a gimbal or similar device whereby a pair of pendulum controlled contacts are adapted to be actuated to circuit closing or circuit opening position, as the case may be, when a sudden shock or pressure impulse is received. In the case of the inertia controlled switch mechanisms heretofore employed for preventing the premature firing of a mine as the result of a countermine explosion, the devices, in general, are not entirely satisfactory under all conditions of service for the reason that a considerable amount of mechanical energy is required to operate the devices and the switch contacts controlled thereby.

The device of the present invention possesses all of the advantages of the prior devices and none of the foregoing disadvantages, the device comprising a relatively small mass slidably arranged within a support and adapted to operate certain circuit closing means controlled thereby in response to a shock or wave of hydrostatic pressure of relatively weak strength. Furthermore, the device is adapted to be secured to the casing of a mine, depth charge or the like whereby the direction of movement of the mass is substantially normal to the surface of the casing and be controlled by impulses or variations in the pressure of the surrounding medium received thereby regardless of the orientation of the casing within in the medium.

One of the objects of the present invention is the provision of a new and improved inertia switch adapted to be secured to the casing of a body disposed within a fluid having circuit controlling means adapted to be operated by relatively weak impulses or variations in pressure received through the fluid.

Another of the objects is to provide a new and improved inertia switch suitable for use with a marine mine having circuit closing means adapted to prevent the premature firing of the mine in response to a countermining impulse.

Another object is the provision of a new and improved inertia switch adapted to be connected to a body arranged within a fluid having means for controlling an external circuit in response to variations in the pressure of the fluid received by the body regardless of the instant position of the device within the fluid.

A further object is to provide a new and improved anti-countermine device of the character disclosed which will be economical to manufacture, reliable in operation and which possesses all of the qualities of ruggedness and durability in service.

Still other objects, advantages and improvements will be apparent from the following description taken in connection with the accompanying drawings of which:

Fig. 1 is a plan view of a switch mechanism according to a preferred embodiment of the invention;

Fig. 2 is an enlarged plan view partially broken away of the device of Fig. 1 with the cover removed.

Fig. 3 is an elevational view in section somewhat enlarged taken along the line 3—3 of Fig. 1;

Fig. 4 is an enlarged view taken along the line 4—4 of Fig. 1;

Fig. 5 is a view taken along the line 5—5 of Fig. 2;

Fig. 6 is a view partly in section of a mine employing the switch mechanism of the present invention as an anti-countermine device; and, Fig. 7 shows in diagrammatic form a complete system suitable for use with the mine of Fig. 6.

Referring now to the drawings on which like numerals of reference are employed to designate like parts throughout the several views and more particularly to Figs. 1 to 6 thereof there is shown thereon a switch mechanism indicated generally by the numeral 10 comprising a base 11 having a plurality of apertures 12 therein adapted to receive the bolts 13, Fig. 6, by means of which the switch is secured to the body within a fluid such, for example, as the mine indicated generally by the numeral 14. Secured to the base as by the screws 15 is a circular plate or support 16 provided with an annular recessed portion 17 coaxially arranged with respect to the cylindrical aperture 18 formed within the support. A mass comprising a weighted plunger 19 is slidably arranged within the aforesaid recessed portion 17 and provided with a shank 21 disposed within the aperture 18 to which is affixed in any suitable manner a button or stud 22 of insulating material suitable for the purpose such, for example, as Bakelite, hard rubber or the like. The plunger 19 is maintained within the recessed portion of the support 16 by a plug 23 arranged within a complementary recessed portion of the support and secured thereto in any suitable manner.

The plunger 19 is normally maintained in engagement with the plug 23 by a contact spring 24 during the time the switch mechanism is not subjected to a shock or impulse. When a shock or impulse, however, is received by the switch mechanism the plunger 19 is moved relative to the support 16 and away from the plug 23 thereby causing the contact spring 24 to be moved into engagement with contact spring 25 momentarily thereby to close a circuit between the conductors 26 and 27 connected thereto, the conductors being preferably arranged within a cable 28. The outward movement of the plunger with respect to the support 16 is arrested by a shoulder 20 arranged on the plunger 19 moving into engagement with the outer wall of the recessed portion 17 of the support 16 and thus there is no possibility of damage to the contact springs 24 and 25 as the result of movement of the plunger.

The contact springs 24 and 25 are secured to the support 16 as by the screws 29 and clamping plate 31 and insulated therefrom and from each other as by the insulating devices 32, 33 and 34, a washer 35 being preferably employed between the screws and the clamping plate 31 to maintain the contact assembly securely clamped at all times to the support 16.

There is also provided a C-shaped member 36 preferably of insulating material secured to the support 16 as by the screws 37 to which is affixed a clamp 38 adapted to secure the cable 28 thereto. The switch is also preferably provided with a cover 39 detachably secured to the support 16 as by the screws 41 and provided with a bushing 42 preferably of suitable insulating material within which is arranged the cable 28.

For a more complete understanding of the invention the switch mechanism 11 is shown attached to the casing of the mine 14, the casing being designated by the numeral 43. The mine may be of any well known type such, for example, as the positively buoyant type of mine illustrated adapted to be moored within a body of water by an anchor 44 having a mooring cable 45 secured thereto and attached to the mine as by the eye 46 affixed to the casing 43. The mine is provided preferably with a wall or partition 47 thereby to form a chamber 48 within which is arranged an explosive charge 49, the explosive charge being introduced within the chamber 48 by reason of the provision of an aperture or filler hole 51 within the casing 43 adapted to be sealed by the cover 52.

The casing is also provided with a well 53 having a booster explosive charge 54 therein adapted to be fired by the detonating device 55 when the detonating device has been moved into operative relation therewith by the pressure of the water on the hydrostat 56. The operation of the hydrostat is delayed for a predetermined period of time after the mine is launched until a soluble washer 57 has dissolved or been softened sufficiently by the water to permit the hydrostat to move from an initial safe position, as is well known in the art in devices of this character. The well is in communication with an air filled chamber 58 of sufficient size to impart a positive degree of buoyancy to the mine by a tube or duct 59 extending therebetween.

There is arranged within the duct 59 a cable 61 having a pair of conductors therein for establishing an external electrical connection between the detonating device 55 and a firing mechanism 62 arranged within the casing 63 and secured to the partition 47 as by the bolts 64. The firing mechanism may be of any type suitable for the purpose. A starting switch indicated generally by the numeral 65 comprising a hydrostat 66 in communication with the surrounding water by reason of the provision of an aperture 67 within the casing 43 is connected to the firing mechanism 62 as by the cable 68 and adapted to close a circuit from the battery B, Fig. 7, included within the casing 63 to the firing mechanism when the hydrostat 66 operates. The hydrostat 66 is preferably provided with a soluble washer or plug adapted to delay the operation of the starting switch until a predetermined time has elapsed after the mine has been planted, as is well known in the art to which the present invention pertains.

The chamber 58 is adapted to be sealed by a cover 69 secured to the casing 43 as by the bolts 71 and maintained in watertight relation therewith as by the gasket 72 arranged between the cover and the casing.

On Fig. 7 is shown in diagrammatic form an arrangement of circuits and instrumentalities for preventing the premature explosion of the mine of Fig. 6 in response to impulses or waves of pressure received through the water as the result of a countermine operation or the explosion of another mine or depth charge within the vicinity of the mine.

Let it be assumed, by way of example, that the mine has been planted within the water for a period of time sufficient to cause the starting switch 65 to close the contacts thereof and the detonator 55 to be moved into operative relation with the booster explosive charge 54. The operation of the starting switch 65 closes a circuit from the positive terminal of battery BA by way of conductor 73 to the firing mechanism 62 thereby causing the mine to be armed. Let it further be assumed that an impulse is received through the water of sufficient strength to cause the plunger 19 of the inertia switch mechanism 10 to move the contact spring 24 into engagement with contact spring 25 of the switch mechanism. When this occurs, a circuit is closed from the positive terminal of battery B by way of resistance 70, conductor 74, contact springs 25 and 24 of inertia switch 10, resistance 75, conductor 76, resistance 77, conductor 78, armature 79 and contact of relay R1 and thence by way of conductor 81 to the negative terminal of battery B thereby raising the potential of conductor 76 and the control grid of the tube T connected thereto sufficiently to fire the tube. The tube T is preferably of the cold cathode gas filled type having the plate thereof connected by way of conductor 74 and resistance 70 to the positive terminal of battery B and the cathode connected by way of variable resistance 82, winding of relay R, conductor 78, armature 79 and the contact of relay R1, conductor 81 and thence to the negative terminal of battery B.

The firing of the tube T closes a circuit from positive terminal of battery B by way of resistance 70, conductor 74, plate and cathode elements of tube T, variable resistance 82, winding of relay R, conductor 78, armature 79 and contact of relay R1, conductor 81 and thence to the negative terminal of battery B thereby causing relay R to operate. The operation of relay R causes relay R1 to operate over the following circuit: positive terminal of battery BA, contacts of the starting switch 65, conductor 83, make contact and armature 84 of relay R, conductor 85, winding of relay R1, conductor 86 and thence to the negative terminal of battery BA. The operation of relay R1 at armature 79 thereof interrupts the connection between conductor 78 and the negative terminal of battery B. The tube T, however, is not immediately extinguished by reason of the provision of condenser C connected to conductors 74 and 78 and adapted to be charged to the potential of battery B at all times except when armature 79 of relay R1 is disengaged from the associated contact. Condenser C is of sufficiently high capacity to prevent the release of relay R for a predetermined period of time after the contacts of the inertia switch are first moved into engagement with each other, the period of time being controlled by the setting of the variable resistor 82.

As armature 87 of relay R1 moves away from its break contact the circuit between the negative terminal of battery BA and the detonator 55 is interrupted thereby preventing the operation of the detonator until relay R1 has released. As armature 87 of relay R1 moves into engagement with its make contact a control circuit is closed from negative terminal of battery BA by way of armature 87, make contact of relay R1, conductor 88 to the firing mechanism 62 thereby to prevent the firing mechanism from closing its firing contacts until relay R1 has released. Preferably, though not necessarily, relay R1 is also provided with an armature 89 adapted to exercise an additional control upon auxiliary devices within the firing mechanism selectively in accordance with the engagement of the armature 89 with the break and make contacts thereof respectively.

As armature 79 of relay R1 moves away from its contact in response to the firing of the tube T, the charge on condenser C causes a current to flow through the variable resistance 82 and winding of relay R in series thereby maintaining relay R operated until the potential of the condenser C has decreased sufficiently to extinguish the tube T. If it be assumed that during the discharge of condenser C the inertia switch 10 is receiving a series of impulses sufficient to cause the contacts 24 and 25 thereof to vibrate into engagement with each other, the conductors 74 and 78 are normally bridged at intervals by the circuit including the resistances 75 and 77. The discharge rate of condenser C, however, is not substantially changed by the current flowing through resistances 75 and 77 for the reason that the resistance elements 75 and 77 are of relatively high resistance.

As tube T is extinguished current ceases to flow through the winding of relay R and relay R releases thereby interrupting the circuit to the winding of relay R1 and causing relay R1 to release. As armature 79 of relay R1 moves into engagement with its contact, condenser C is quickly again connected to the terminals of battery B through resistance 70 and quickly charged to the potential of battery B. The tube T is thus rendered effective to be fired by a subsequent closure of the contacts 24 and 25 of the inertia switch. As armature 87 of relay R1 moves away from its make contact negative battery is removed from conductor 88 thereby removing the aforesaid control from the firing mechanism 62 whereby the firing mechanism is again in condition to close the firing contacts thereof and explode the mine in response to a signal received from a vessel. As armature 87 moves into engagement with the break contact thereof negative battery is applied to the detonator 55 and the mine is again in an armed condition. In a similar manner the movement of armature 89 of relay R1 from the make contact to the break contact thereof exercises an additional control upon the firing mechanism.

Whereas the inertia switch has been described with reference to a pair of contacts adapted to be moved into engagement with each other in response to an impulse or shock received by the switch, it will, of course, be understood that, if desired, the switch may be arranged to interrupt a pair of normally closed contacts as the switch operates and the switch may, if desired, be provided with additional pairs of contacts adapted to control selectively a plurality of external control circuits connected thereto. Furthermore, the inertia switch of the present invention may be advantageously employed as an anti-countermine device for a depth charge, torpedo or the like.

Whereas the invention has been described with reference to a particular example which gives satisfactory results it will be understood by those skilled in the art, after understanding the invention, that various changes and modifications may be made without departing from the spirit and scope of the invention and it is my intention, therefore, in the appended claims to cover all such changes and modifications.

The invention herein described and claimed may be manufactured and used by or for the Government of the United States of America for governmental purposes without payment of any royalties thereon or therefor.

What is claimed as new and desired to be secured by Letters Patent of the United States is:

1. An inertia switch for a mine comprising a support, a unitary mass slideably arranged within said support, stop means integral with said mass and engageable with said support for limiting the extent of movement of said mass, a plurality of switching elements disposed adjacent said mass and adapted to be momentarily operated thereby to make and break in a substantially simultaneous sequence in response to a countermine impulse received by said support, and an insulating member secured to the mass and positioned between one of said elements and said mass, said one of said elements being tensioned against the insulating element.

2. An inertia switch comprising a support having a recessed portion therein, a unitary mass slideably arranged within said recessed portion of the support, stop means integral with said mass and engageable with said support for limiting the extent of movement of said mass relative to said support, an insulating member secured to said mass and movable therewith, a resilient switching element in engagement with said insulating member and adapted to maintain the mass yieldably in a predetermined initial position within said recessed portion of the support, and a contact element adapted to be engaged momentarily by said switching element when the mass has moved a predetermined distance from said initial position within the support in response to an impulse received by the support to thereby make and break in a substantially simultaneous sequence.

3. An inertia switch of the character disclosed comprising a base, a unitary mass slideably arranged within said base and including insulating means as a portion thereof, means for yieldably urging the mass in a predetermined initial position with respect to the base and in engagement with said insulating means of said mass, a pair of contact elements adapted to be moved into momentary engagement with each other to thereby make and break in a substantially simultaneous sequence when the mass has moved within said base a predetermined distance from said initial position, one of said contact elements being carried by said urging means, and a cover for said switch having an aperture therein, means for detachably securing the cover to said base, and a cable having a pair of electrical conductors therein disposed within said aperture for establishing an external electrical circuit connection to said pair of contact elements.

4. In a device of the class described, in combination, a base, a mass slideably arranged within said base and including insulating means as a portion thereof, means in engagement with said mass for yieldably maintaining the mass in an initial position with respect to said base, a plurality of circuit controlling means adapted to be operated momentarily by said mass when the mass has moved a predetermined distance from said initial position within said support in response to an impulse received by said base, one of said circuit controlling means being carried by said maintaining means, means including an electrical cable for establishing an external circuit connection to said circuit controlling means, a bifurcated member secured to said support and partially enclosing said circuit controlling means, a cover secured to said support having an aperture therein within which said cable is disposed, and means for clamping the cable to said bifurcated member intermediate said aperture and said circuit controlling means.

5. In a system for firing a mine disposed within a body of water, a mine firing mechanism including a firing circuit, an electro-responsive device having means for interrupting said firing circuit as the device operates, a source of electrical potential, a normally inactive electronic tube having a grid control element, an electrical circuit including a pair of normally closed contacts on said electro-responsive device for connecting the electronic tube to said source of electrical potential selectively in accordance with the operated condition of the electro-responsive device, a control relay within said electrical circuit having means for operating said electro-responsive device as the relay operates, an inertia switch adapted to apply a predetermined potential to said grid control element sufficient to activate the electronic tube as the inertia switch operates in response to an impulse received through the surrounding water, and a capacitor connected across said electronic tube and said relay and selectively connected by said normally closed contacts across said source of electrical potential for maintaining the electronic tube activated for a predetermined period of time after the source of electrical potential has been disconnected from said capacitor and said tube by said pair of normally closed contacts of the electro-responsive device.

6. In a mine adapted to be planted within a body of water, the combination of means including an electro-responsive detonating device for firing the mine, a firing circuit connected to said detonating device, a normally inactive electronic tube having a grid control element, a source of electrical potential operatively connected to said electronic tube, switching mechanism comprising a pair of normally open contacts adapted to apply a potential from said source to the control grid of said electronic tube sufficient to fire the tube as said pair of contacts are closed, means responsive to an impulse received through the water for closing said contacts, and electro-responsive means controlled by said electronic tube for interrupting said firing circuit as the electronic tube is fired in response to the closing of the contacts of said switching mechanism.

7. In a mine adapted to be planted within a body of water, the combination of a mine firing mechanism, a firing circuit adapted to be closed by said firing mechanism, a detonating device included within said firing circuit adapted to explode the mine, an electrical relay having a pair of normally closed contacts adapted to interrupt said firing circuit as the relay operates, a source of electrical potential, a condenser operatively connected to said source of electrical potential and normally charged thereby, means on said electrical relay for disconnecting the condenser from said source of potential as the relay operates, a normally inactive electronic tube having the anode and cathode thereof respectively connected in circuit with said condenser, a control element for said electronic tube, an anti-countermine device comprising means adapted to apply potential to said control element sufficient to fire the tube in response to an impulse received through the water, means in said last named circuit controlled by the electronic tube for operating said electrical relay, and means settable at will for controlling the rate of flow of the discharge current of the condenser through the tube.

8. In a system of the character disclosed for controlling the firing of a submarine mine, a mine casing having an explosive charge therein, an electro-responsive detonating device adapted to fire said explosive charge, a firing circuit connected to said detonating device, mine firing control mechanism adapted to close said firing circuit, an electrical relay having a pair of normally closed contacts included within said firing circuit for interrupting said firing circuit as the relay operates, means including an electronic tube for operating said relay as the tube is fired, a switching mechanism secured to the casing of said mine and having an inertia element therein adapted to operate the switching mechanism in response to an impulse received through the surrounding water, means including a plurality of circuit connections for firing said electronic tube as the switching mechanism operates, means for extinguishing said tube when a predetermined period of time has elapsed after the tube has been fired, and means included within said electrical relay for applying a control to said firing mechanism during said predetermined period of time.

9. An inertia switch of the character disclosed and comprising a circular support having interior wall surfaces defining a coaxial cylindrical aperture in the innermost portion of said support, said interior wall surfaces further defining an annular coaxial inwardly stepped recess extending from the outermost extremity of said support inwardly to said aperture, a plunger substantially T-shaped in cross section and slidably carried by the support and positioned therein with the shank of said plunger being disposed within said aperture and the transverse portion of the plunger being disposed within said recess, a stop member secured to the interior wall surfaces of said support at the outermost portion thereof and transversely thereto to provide a stop for said plunger at one limit of reciprocation thereof, the shank portion of said plunger including interior surfaces defining a plug recess, an insulating plug secured within said plug recess and protruding therefrom, a first spring contact arm in tensioned engagement with said insulating plug, a second contact arm spaced a predetermined distance from said first arm, means for supporting said arms in said spaced relation, said transverse portion of said plunger being of such thickness as to permit the plunger to slide inwardly a distance at least equal to the distance between said contact arms to thereby effect engagement of said contact arms.

References Cited in the file of this patent

UNITED STATES PATENTS

| | | |
|---|---|---|
| 913,524 | Leon | Feb. 23, 1909 |
| 1,310,568 | Heap et al. | July 22, 1919 |
| 1,407,653 | Hammond | Feb. 21, 1922 |
| 2,093,414 | Burgan | Sept. 21, 1937 |
| 2,156,751 | Collins | May 2, 1939 |
| 2,176,268 | Moran | Oct. 17, 1939 |

FOREIGN PATENTS

| | | |
|---|---|---|
| 602,624 | France | Aug. 25, 1925 |
| 318,029 | Germany | Jan. 9, 1920 |
| 554,282 | Germany | July 7, 1932 |